April 13, 1937.  L. HOLM  2,077,362
ELECTRICAL SWITCH OF THE SNAP SPRING TYPE
Filed Dec. 13, 1934
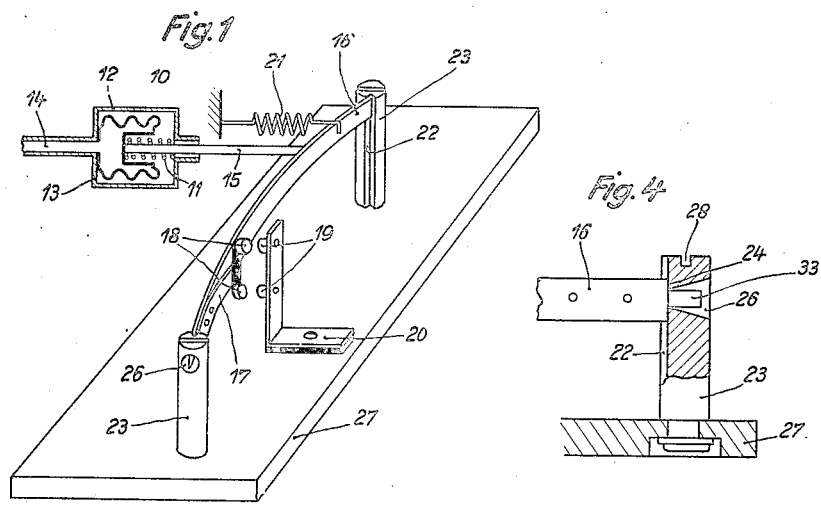
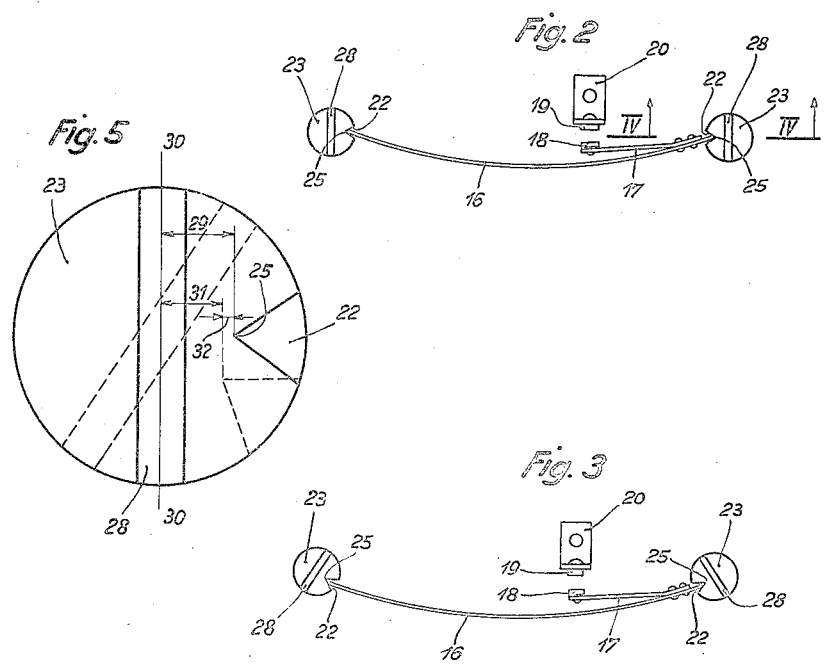
Inventor
Ludvig Holm
by Steward & McKay
his attorneys Patented Apr. 13, 1937

2,077,362

UNITED STATES PATENT OFFICE 2,077,362

ELECTRICAL SWITCH OF THE SNAP SPRING TYPE

Ludwig Holm, Stuttgart, Germany, assignor to Robert Bosch Aktiengesellschaft, Stuttgart, Germany Application December 13, 1934, Serial No. 757,407 In Germany December 20, 1933

3 Claims. (Cl. 200—67)

The present invention relates to electric switch arrangements, more especially intended for refrigerators, having a snap spring the loading of which is influenced by altering the spacing of the supporting points of the spring. In known arrangements of this kind the spring bearings are moved in the longitudinal direction of the spring, for example, by an adjusting screw, to vary the loading of the spring. These adjusting devices are inconvenient, expensive and not always reliable, because either a special guide for the displaceable spring bearing and an additional bearing for the adjusting screw, must be provided in the base-plate, or the spring bearing itself must be connected with the adjusting screw so as to be easily rotatable.

According to the invention, the arrangement is substantially simplified and improved by the spacing of the supporting points of the spring being no longer altered by displacement, but by a simple swivelling or angular movement of one or both spring bearings. An arrangement is more especially preferable in which the spring bearing or bearings can be turned about an axis standing at right angles to the snap plane of the spring.

An example of construction of the invention is shown in the accompanying drawing, in which:—

Figure 1 is a perspective view of a switch arrangement for a refrigerator.

Figure 2 is a plan view of a part of the same arrangement.

Figure 3 is the same plan view as in Figure 2, but with the bearings adjusted.

Figure 4 is a section on the line IV—IV of Figure 2.

Figure 5 illustrates graphically the variation in the spacing of the spring supports according to the invention.

10 is a thermostat which responds to the temperature of the refrigerating chamber of a refrigerating plant or to the evaporator temperature. It consists of a spring bellows 12, loaded by a spring 11, and filled with a liquid that greatly expands on variations in temperature. This bellows is enclosed in a casing 13, and connected by a pipe 14 with a container or casing (not shown) located in the refrigerating chamber or near the evaporator. The movements of the spring bellows 12 produced by alterations in temperature are transmitted to a pin 15, which in its turn acts on a snap spring 16. A smaller spring 17, carrying insulated contacts 18, is riveted to the snap spring 16. Counter-contacts 19 are seated on a contact-carrier 20 which is supported by and insulated from a base plate 27 forming a part of the switch casing. When the pin 15 presses sufficiently strongly against the snap spring 16, the latter snaps into the other end-position, whereby the contacts 18, 19 are pressed upon each other, and thus the current is switched on. When the temperature of the refrigerator to be controlled sinks, the spring 11 compresses the bellows 12, and the pin 15 moves away from the snap spring 16, which now by the action of a spring 21 snaps back again into the original end-position shown in the drawing, whereby the two contacts 18, 19 are suddenly pulled apart. The construction of the contact-carrier 17 as a spring which is secured to the snap spring is especially advantageous for a rapid breaking of the contacts.

The snap spring 16 is mounted with its ends in notches 22, which are cut in bolts 23, and run parallel to the axis of the bolts. The ends of the snap spring bear with shoulders 24 against an edge 25 of the notch, whilst the extreme outer ends 33 of the spring project into conical recesses 26 in the bolts 23. This arrangement prevents a springing out of the spring. The bolts 23 are frictionally mounted in such a way in a base-plate 27, which will generally form a part of a casing enclosing the switch arrangement, that they can be turned by hand. To enable the bolts to be turned simply with a screwdriver, grooves 28 are provided on the top end of the bolts. If the bolts 23 are rotated about their axis to a certain amount, the notches 22, and thus the edge 25 in each bolt, somewhat alter their position, and they are in fact, turned outwards (Figure 3). In this way, however, the distance between the two bearing points in the two bolts 23 is increased and thus the loading of the spring 16 diminished. In Figure 5, 29 is the distance of the edge 25 from the axis 30—30 running at right angles to the line connecting the two bolts 23. If now the bolt 23 is so turned that the notch 22 assumes the position shown in broken lines, then the edge 25 has only a distance 31 from the axis 30—30, which is smaller by the amount 32 than in the first position of the bolt. If the other bolt is turned in the same way, then the distance apart of the two bearing points (edges 25) of the spring 16 is increased by an amount that is twice as great as the amount 32. The spring 16 is thus now less strongly loaded than before.

I declare that what I claim is:

1. In a switch of the snap spring type, a snap spring, supports for said spring, operating means by the movement of which the spring quickly snaps over from one position to the reverse position and vice versa, at least one of said supports being adjustable by rotation about an axis to vary the loading of the spring, said axis being normal to the plane of movement of the spring on snapping, and a friction bearing for said rotatable support to secure by friction said support in every adjusted position.

2. In a switch of the snap spring type, a snap spring, supports for said spring, operating means by the movement of which the spring quickly snaps over from one position to the reverse position and vice versa, at least one of said supports being adjustable by rotation about an axis to vary the loading of the spring, said axis being normal to the plane of movement of the spring on snapping, and a friction bearing for said rotatable support to secure by friction said support in every adjusted position, said support consisting of a rotatable member provided with a recess extending longitudinally to and eccentrically of its axis, one end of the snap spring resting in said recess.

3. In a switch of the snap spring type, a snap spring, supports for said spring, operating means by the movement of which the spring quickly snaps over from one position to the reverse position and vice versa, at least one of said supports being adjustable by rotation about an axis to vary the loading of the spring, said axis being normal to the plane of movement of the spring on snapping, a friction bearing for said rotatable support to secure by friction said support in every adjusted position, said support consisting of a rotatable member provided with a recess extending longitudinally to its axis and a tapered opening leading from the bottom of said recess, one end of said spring being provided with a shoulder and a projection, said shoulder resting on the bottom of the longitudinal recess and said projection extending into said opening of said member.

LUDWIG HOLM.